Sept. 5, 1939.  V. V. PEONE  2,172,089
HYDRAULIC CHANGE SPEED MECHANISM
Filed April 6, 1938  3 Sheets-Sheet 1
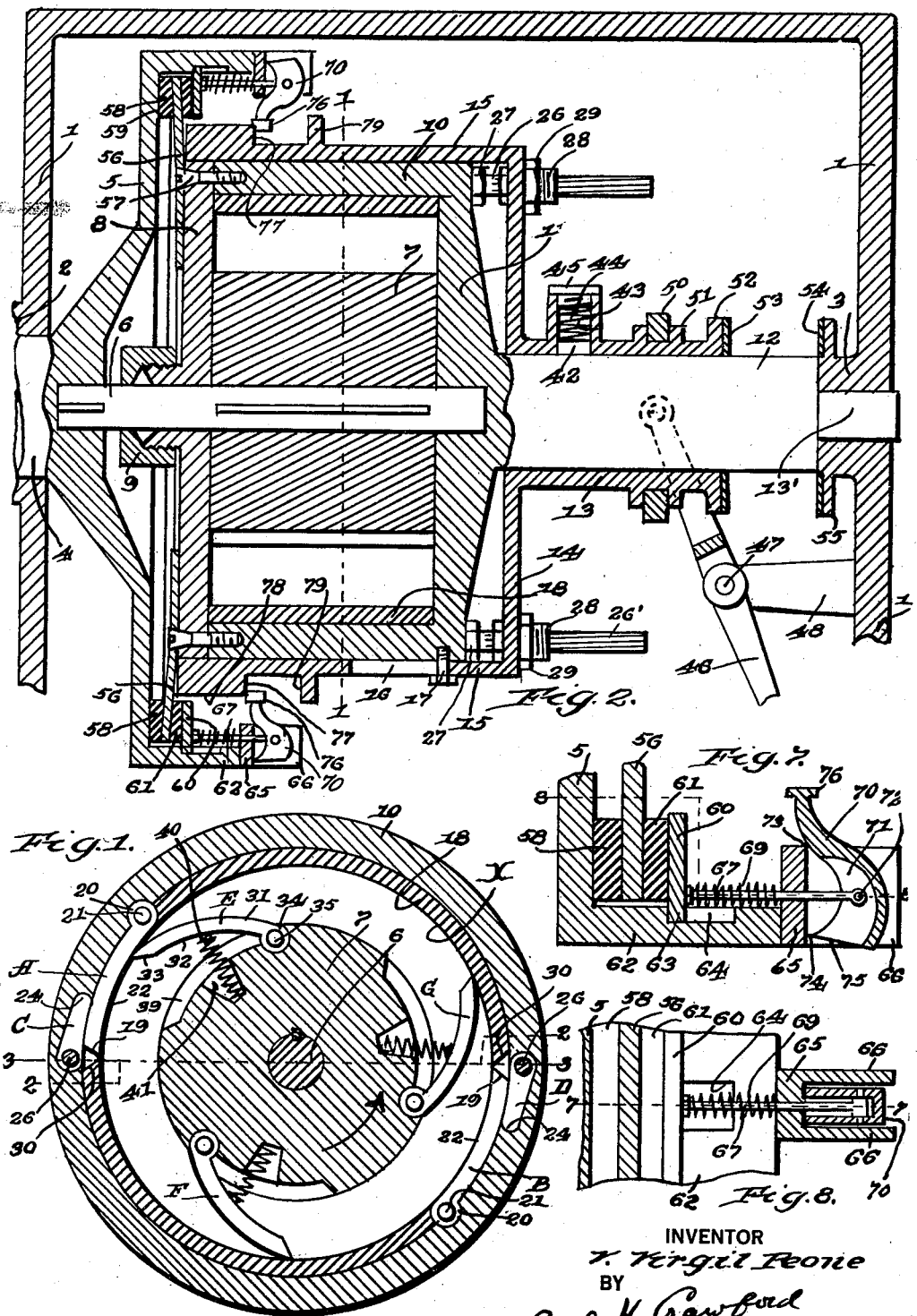
INVENTOR
V. Virgil Peone
BY
Carl M. Crawford
ATTORNEY

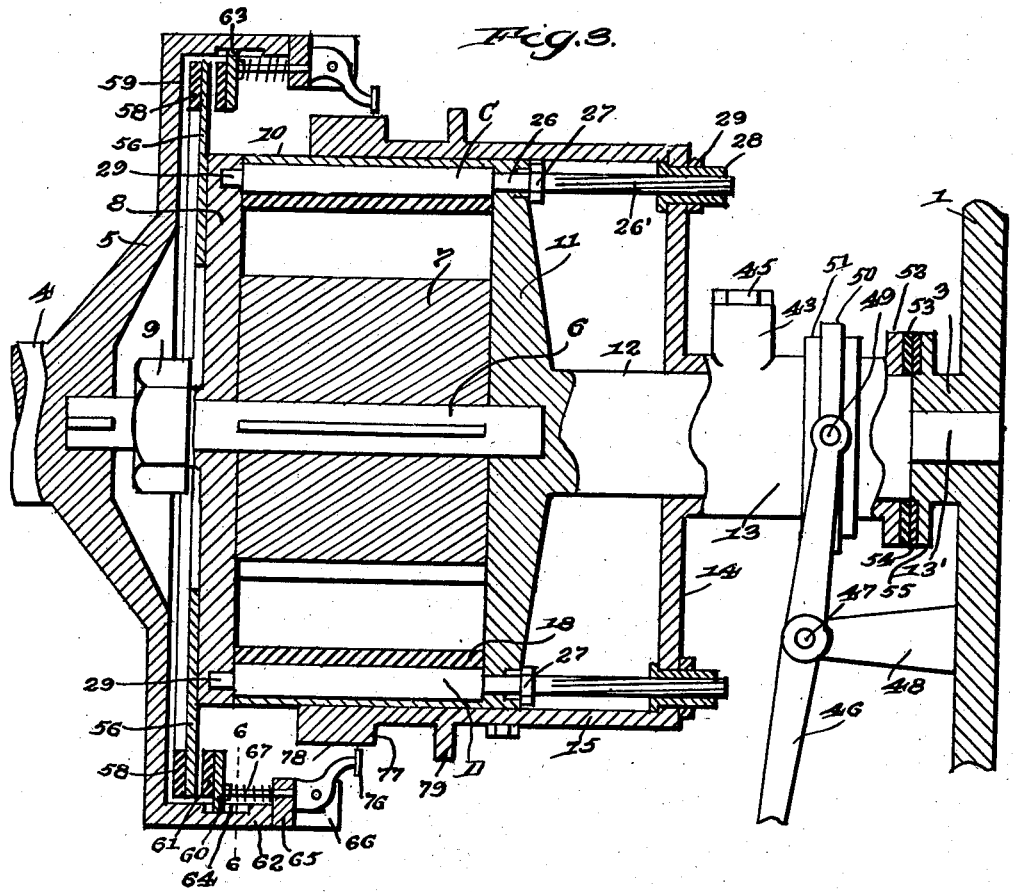
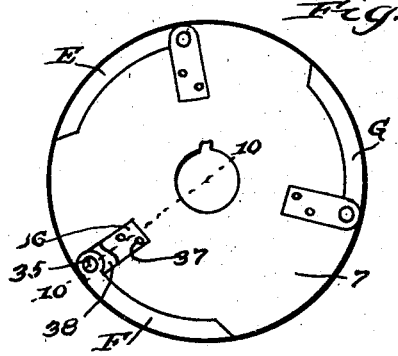
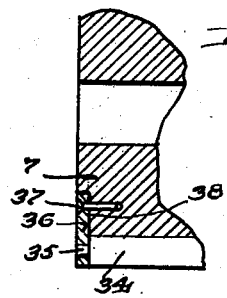

Sept. 5, 1939.  V. V. PEONE  2,172,089
HYDRAULIC CHANGE SPEED MECHANISM
Filed April 6, 1938  3 Sheets-Sheet 3
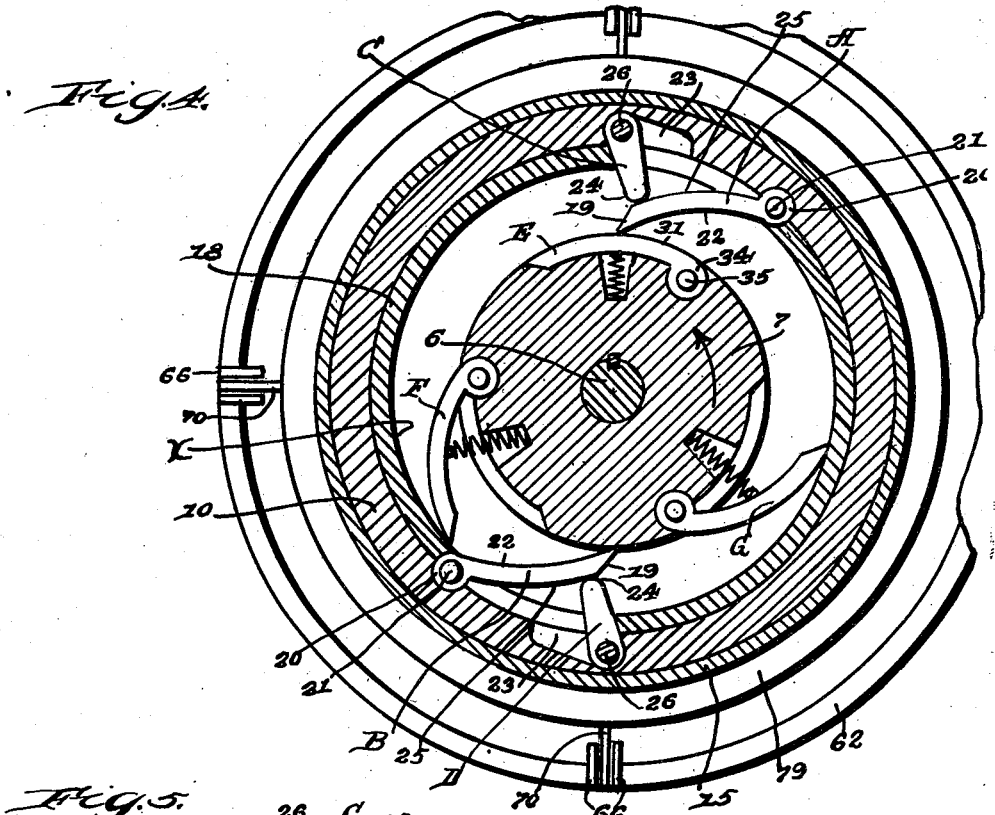
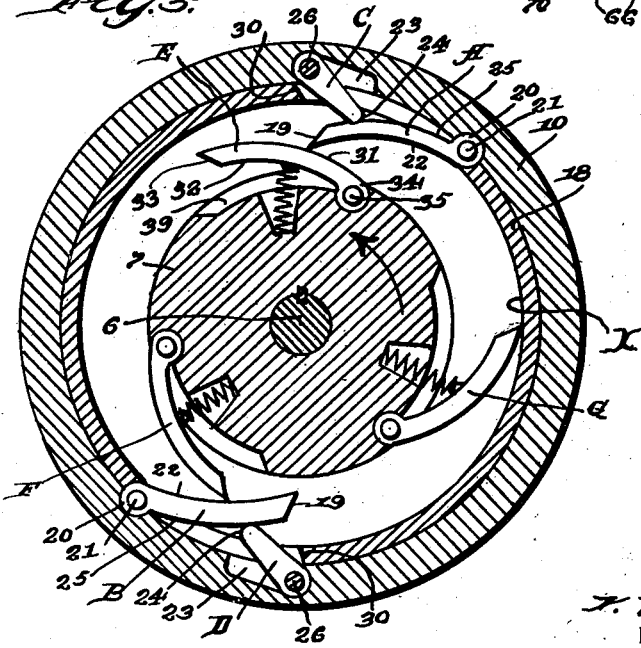
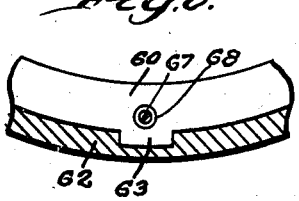
INVENTOR
V. Vergil Peone
BY
Carl H. Crawford
ATTORNEY Patented Sept. 5, 1939

2,172,089

UNITED STATES PATENT OFFICE 2,172,089

HYDRAULIC CHANGE SPEED MECHANISM

Valley Virgil Peone, Spokane, Wash.

Application April 6, 1938, Serial No. 200,334

6 Claims. (Cl. 192—57)

This invention relates to improvements in variable speed transmission mechanism.

It is a feature of the invention to provide a gearless variable speed mechanism adapted to be adjusted to transmit any speed from neutral or zero to maximum, and when at a substantially maximum speed adjustment, the mechanism is automatically thrown into a direct drive friction connection.
A feature of the variable speed portion of the invention consists in a driving rotor and a driven shell, the rotor and shell having blades adapted to coact with each other, and with the interposed liquid or oil, to transmit drive from the rotor to the shell.

A further feature relative to the rotor and shell members and the blades thereof is that certain of the blades are capable of being adjusted to vary the speed of the shell member with respect to that of the rotor member.

It is a feature of the invention to provide an arresting clutch that automatically operates to arrest rotation of the driven or shell member when the blades are adjusted to neutral.
It is also a feature of the invention to provide a blade adjusting means which is rotatable with the shell and which is adjustable longitudinally of the axis of rotation of the shell.

The invention has many other objects and features which will be more fully described in connection with the accompanying drawings and which will be more particularly pointed out in and by the appended claims.

In the drawings:
Fig. 1 is a sectional view on line 1—1 of Fig. 2.
Fig. 2 is a sectional view on line 2—2 of Fig. 1.
Fig. 3 is a sectional view on line 3—3 of Fig. 1.
Fig. 4 is a sectional view similar to Fig. 1, with the blades in an adjusted position different from said figure.
Fig. 5 is a sectional view similar to Fig. 4, with the blades in a still further variation of adjustment.
Fig. 6 is a detail sectional view on line 6—6 of Fig. 3.
Fig. 7 is an enlarged view of a clutch actuating means taken on line 7—7 of Fig. 8.
Fig. 8 is a sectional view thereof taken on line 8—8 of Fig. 7.
Fig. 9 is an end view of the rotor.
Fig. 10 is a sectional view on line 10—10 of Fig. 9.

Like characters of reference designate similar view throughout the different figures of the drawings.

The invention, as shown, combines a variable speed hydraulic transmission means, with a direct friction drive clutch mechanism, and I will first describe the former in detail after generally designating the various necessary parts of the structure.

A housing 1 is provided what has a bearing 2 and a bearing 3. A constant speed driving shaft 4 is journaled in bearing 2, and may be connected with any source of power, not shown. I have shown a friction clutch wheel, generally indicated at 5, mounted on or formed integral with shaft 4, and said wheel will be later described in detail. Keyed or otherwise nonrotatively connected with wheel 5 is a rotor shaft 6 on which a rotor 7 is keyed. A shell encloses said rotor and is shown as comprising an end wall 8 having a suitable packing gland engagement with shaft 6, as indicated at 9. Said shell includes a cylindrical wall 10, which may be formed integral with an end wall 11, and the latter has a shaft 12 which is reduced at 13' and is shown journaled in bearing 3. Slidable longitudinally on this shell shaft 12 is the sleeve 13 of my improved blade shifting or adjusting mechanism which includes a flange 14 formed integral with sleeve 13, and a sleeve 15, which outwardly telescopes shell wall 10 and is nonrotatably connected therewith by means which may take the form of a slot and pin connection, the slot being indicated at 16 and the pin or screw at 17. It will be seen that the remaining end of rotor shaft 6 is journaled in end wall 11 of the shell. However, the shell is rotatable independently of shaft 6 and rotor 7.

Having now generally indicated the major portions of the device, I will next refer specifically to the variable change speed portion thereof.

The inner face or perimeter of the shell is provided with a liner, preferably of steel or hardened material, as indicated at 18, which extends the full width of the shell, as shown in Fig. 2, and which extends throughout the inner circumference, except for certain interruptions to be presently described, as shown in Fig. 4. The shell is provided with a plurality of liquid thrust taking or shell propelling blades which, in the present form, are two in number, and as both are identical in form and function, only one need be described in detail but for purposes of later reference, they will be given different general reference characters, A and B.

Said shell blade is arcuate in form and extends the full width of the shell and is provided with a chamfered rotor engaging edge 19. The radius from which said arcuate blade is struck, is the same as the radius of the liner, and the blade A has substantially the same thickness as the liner 18. That side edge opposite edge 19 is rounded at 20 and provided with endwise projecting trunnions, one thereof indicated at 21 being adapted to be journaled in the end wall 11, and the other, not shown, being adapted to be journaled in the end wall 8 of the shell. Thus, the rounded edge is, as shown, socketed in the liner 18 and wall 10 of the shell so that this pivotally mounted blade A may tilt into various positions toward or away from the periphery of the rotor 7. The liquid abutting or thrust face of the blade A is indicated at 22. When adjustment is made at zero or neutral, as shown in Fig. 1, it is desirable to dispose blades A and B in a non-functioning position, and for this purpose the liner 18 is interrupted to form a recess into which the blade A may retract so that its thrust face 22 will be flush with the liner 18. Both of these shell blades A and B normally tend to seat in their recesses as a result of oil pressure and centrifugal action.

Reference will next be made to the manner and means whereby these shell propelling blades A and B are projected into thrust taking positions.

Cams C and D, identical in form and function, are provided, one for each of said blades A and B, and only one need be described in detail. The wall 10 of the shell is recessed at 23 so that cam C can be retracted into said recess behind its blade A, as shown in Fig. 1. The free or actuating edge of said cam C is indicated at 24, and is adapted for engagement with the rear face 25 of blade A, to project the latter into a shell propelling position. Said cam C has an operating rod 26 that is journalled in the shell and extends through a packing gland 27 (Fig. 3) and projects through a suitably threaded nut 28, secured by a bur 29, to flange 14. Said rod 26 has spiral threads 26' which act to turn cam C when my improved blade adjuster is shifted from the Fig. 2 to the Fig. 3 position, and vice versa, or to any intermediate position, as will be later described.

The remaining end of said cam C has a trunnion 29 which is journalled in end wall 8. Cam D is similarly equipped and identified by the same reference numerals. Thus, it will be seen that when the threaded cam shifting means is adjusted, both cams C and D will be adjusted in synchronism, and, viewing Fig. 5, cams C and D will both be projected clockwise and automatically held in their adjusted positions.

It will now be clear that the interruption of the liner 18, to form a recess for blade A, has a terminal 30 that forms a stop for cam C and a like terminal 30 forming a stop for cam D. When blades A and B are retracted their chamfered ends 19 close this space to form a continuous perimeter for the liner, and the latter fits about the rounded edge 20 of the blades so there will be no break, as shown in Fig. 1.

Reference will next be made to the rotor and its oil propelling blades and the manner in which they are constructed.

The rotor 7 is shown provided with a plurality of oil propelling blades, which in this construction, are three in number and as all are identical in form and function, only one will be described in detail but different general reference letters will be applied thereto for convenience in describing the operation later on. Thus, these oil propelling blades are generally indicated at E, F and G.

Referring to blade E, the same is arcuate in form and the outer or non-acting face 31 is struck from the same radius as the periphery of the rotor 7, and the inner or acting face 32, which propels the oil is concentric with respect to the outer face 31. The free edge is chamfered at 33 and the remaining side edge is rounded at 34 and is socketed in a similarly formed recess in the periphery of rotor 7. In order to retain the blades in position, the ends are provided with trunnions 35 which are journalled in plates 36 (Fig. 9) that are secured at 37, in suitable recesses 38, in the ends of rotor 7.

The rotor 7 is peripherally recessed at 39 to permit blade E to retract thereinto and form a flush periphery for the rotor, as will now be clear. To insure a normally open or projected position for the blade, I provide a spring 40 which is disposed in a socket 41, in rotor 7, and which normally acts to project blade E. However, this is a relatively light duty spring and primarily, the oil will act to project or open blade E as the rotor turns counter-clockwise, viewing Fig. 5, as indicated by the arrow.

The intervening annular space between the perimeter X, of the shell, and the periphery of rotor 7, will be filled with a suitable liquid which is preferably, though not necessarily, oil. In Fig. 1, I have shown the neutral adjustment where the blades E, F and G of the rotor advance the oil without propelling the shell, the rotor blades having no coaction with the shell blades A and B, but merely traverse the same in making their successive revolutions. In Fig. 5 I have shown an intermediate adjustment wherein the blades E, F and G of the rotor 7 coact with the blades A and B of the shell, and in Fig. 4 I have shown the maximum speed adjustment wherein the shell will be rotated at practically the same speed as the rotor.

Reference will next be made to the cam shifting means and more particularly to Figs. 2 and 3.

The sleeve 13 is provided with a spring actuated brake which, as shown, consists of a block of braking material 42, slidably disposed in a tubular boss 43 formed integral with sleeve 13, and held against shaft 12 by a spring 44 that is advanced by a cap 45, threaded into said boss. This braking device acts to hold sleeve 13 in its various positions of adjustment longitudinally of shaft 12.

A reverse lever 46 is pivoted at 47 to an arm 48, extending from the housing 1, and is forked to span sleeve 13 and its forked ends are pivoted at 49 to a ring 50 that is held between flanges 51 of sleeve 13. The rear end of said sleeve 13 is flanged at 52 and the latter is faced with a braking member or ring 53, adapted to engage a braking member or ring 54, mounted in a flange 55, fixed to the housing. Thus, when the parts are shifted from the operating adjustment shown in Fig. 2, to the zero or neutral adjustment shown in Fig. 3, this arresting brake will function to prevent rotation of the shell, as will now be clear.

Reference will next be made to the means and manner in which the transmission mechanism will be automatically clutched into direct friction drive when certain of the blades have been adjusted into a substantially maximum speed position.

A resilient clutch ring 56 is secured to end wall 8 of the shell by screws 57, which, together with other screws, not shown, serve to hold walls 8 and 10 together. A braking ring 58 is secured to ring 56 and is adapted for engagement with a braking surface 59, on clutch wheel 5, when clutch ring 56 is sprung to the left of Fig. 2, or in other words, toward wheel 5. An actuating clutch ring 60 has a brake ring 61 adapted to be forced into engagement with ring 56 to spring ring 58 into clutch engagement with surface 59 of wheel 5, as shown in Fig. 2. The unclutched relation is shown in Fig. 3. This clutch shown acts frictionally, but I do not want to be limited to a frictional clutch.

Reference will next be made to the devices for automatically effecting the friction clutch relation just described.

Wheel 5 has a cylindrical flange 62, which overhangs the shell and as shown in Figs. 2, 3 and 6, ring 60 has a series of key projections 63, one only being shown, and flange 62 is slotted at 64 to receive the key, whereby ring 60 will be non-rotatably connected with flange 62 but can slide in the direction of the axis about which wheel 5 revolves. I have provided a series of actuating devices for releasing and retracting ring 60, but as all are identical in form and function, only one need be described in detail, reference being had to Figs. 7 and 8, in addition to Figs. 2 and 3.

A U-shaped guide is secured to the inner edge of flange 62, and comprising a bight 65 and limbs or sides 66. A rod 67 is slidable in the bight 65 and has one end connected with ring 60, at 68, and a spring 69, interposed between ring 60 and bight 65, normally acts to shift ring 60 into a clutch position, or in other words, toward wheel 5.

A trigger lever 70 is freely disposed between sides 66, and has a centrally disposed recess 71 into which the remaining end of said rod 67 extends and is pivoted at 72. This recess 71 is of sufficient area to permit lever 70 to take different positions, as will presently appear, without interfering with the connection of rod 67 therewith. Said lever has what I will term releasing portions 73 and 74, which engage bight 65, as shown in Figs. 2 and 7, to release ring 60 for direct drive clutch engagement. Said lever 70 also has a ring retracting portion 75 adapted for engagement with bight 65 for retracting ring 60 from a clutch engagement, as shown in Fig. 3. Said lever 70 has an actuating end provided with a head 76, which may, if desired, be rotatable, and this head 76 is adapted to be engaged and actuated by means which I will next describe.

Sleeve 15 has a cylindrical and short radius rim providing an actuating face 77 and a free face 78. A restoring flange 79, which is cylindrical, has a greater radius than face 77. Thus, when sleeve 15 is adjusted from the Fig. 2 to the Fig. 3 position, face 77 will engage head 76 and shift lever 70 from the releasing position shown in Fig. 2, to the retracted position shown in Fig. 3, and head 76 will be free from engagement with face 78. Then when sleeve 15 is restored to the Fig. 2 position, flange 79 will engage head 76 and shift lever 70 back to the Fig. 2 position. It will thus be seen that this engageable relationship will be maintained even though the shell rotates at a different speed from wheel 5.

The operation will next be described and I will first refer to the variable speed portion of the invention involving Figs. 1, 4 and 5.

In Fig. 1 the cam shifting means has been adjusted to the Fig. 3 position, and the cams C and D are retracted into their recesses so that the shell blades A and B will be retracted by the oil that is being propelled about the intervening space by the rotor blades E, F and G. Thus, no rotary thrust is imparted to the shell and the latter will be arrested by the brake members 53 and 54, from any rotary impulse that might otherwise be imparted by skin frictional engagement of the oil against the perimeter X. The resistance of the oil, which is idly advanced by rotor blades E, F and G, acts to maintain the rotor blades in the full open position shown in Fig. 1, with their free ends engaging the perimeter X of the shell. In this adjustment, the levers 70 are in the Fig. 3 position, and of course rotate with the clutch wheel 5 while the shell and sleeve 15 are at rest. The rotor 7, is driven in the direction of the arrow shown in Fig. 1.

In the Fig. 5 position, the sleeve 15 will have been advanced to an intermediate position toward the Fig. 2 position, but of course not far enough to actuate levers 70. In this Fig. 5 position the shell will not be driven at a speed equal to that of the rotor. For instance, the cams C and D partly project shell blades A and B toward but not into actual engagement with the periphery of the rotor 7. Thus, blade G will propel oil against blade A, which, due to its projected position, will reduce the passage area and hence the resulting thrust will be imparted to blade A. Of course oil pressure will depress blade E into its recess against th eaction of spring 40.

Thus, at each revolution of the rotor, (as indicated by the arrow) which of course in this adjustment is rotating faster than the shell, the several rotor blades will successively advance under and beyond the shell blades, and as each rotor blade is released by a shell blade, it will be projected by the oil which it is advancing outwardly into engagement with the perimeter X. The reduced egress oil passage formed by this adjustment of blades A and B, can be seen by viewing the space between the end of the latter blade and the periphery of the rotor. However, at all times, in this adjustment, at least one rotor blade will be in a full or maximum oil propelling position, and sometimes two blades will be. In the position shown, blade G is in a maximum oil propelling position. With a slightly greater advance movement, and before blade G reaches blade A, blade E will have passed under blade A and will be in a maximum oil propelling position. This will be a blade adjustment position in which the operator either desires an intermediate speed of the shell, or a position attained as a result of a gradual increase of shell speed up to the maximum. In detailing the action of blades A, E and G, the corresponding action of the remaining blades will be obvious from Fig. 5. It will also be seen that in this position, and in all shell propelling positions except the maximum, the shell and rotor blades coact with each other, and the rotor blades coact with the perimeter of the shell by actual engagement. It will also be clear that movement of the blades E, F and G, under and outwardly from blades A and B, will be noiseless because the blades are immersed in oil.

Reference will next be made to the showing disclosed in Fig. 4.

In this position of the cams C and D are adjusted to the maximum extent so that their ends are in actual contact with the periphery of the rotor 7, hence no oil can get past them except by leakage which will be slight. Should sufficient leakage occur, blade F would be depressed into its recess, the same as blade E, and there would be a slight increase of speed of the rotor as compared to that of the shell. However, in this maximum adjustment, egress past blades A and B is practically arrested, and hence the projected rotor blades F and G will propel the oil against shell blades B and A, respectively, the same as a piston in a cylinder, and hence the shell would be rotated practically as fast as the rotor, and in the direction indicated by the arrow.

However, slightly before, or approximately at the time this maximum speed adjustment had been attained, the free face 78 would have passed over head 76 of trip lever 70, and the restoring flange 79 would have engaged head 70 and rocked the lever, in fact all the levers 70, from the retracted position shown in Fig. 3, to the releasing position shown in Fig. 2, thereby permitting the spring 69 to force ring 60 toward wheel 5 and cause the frictional clutch members 61, 56 and 58 to effect the direct relationship whereby the shell would be frictionally clutched to wheel 5, so that it and shaft 12 will rotate at the same speed as drive shaft 4.

It will be clear that the device of my invention provides an elastic an dwide range of intermediate speeds from zero or neutral to maximum, and that it does not involve any gears. Further, its utility in any capacity in which a variable and direct friction drive mechanism is required, will now be understood.

Because of the spiral threads 26', of the cam shifting means, it will be clear that after the cams C and D have been adjusted to any position, they will be automatically held in the position to which they have been adjusted.

It will be seen that by disposing the sleeve 15, slidably on the shell wall 10, I effectively center and maintain alinement of the nuts 29 with the threaded rods 26, so that there will never be any torsion or shearing stresses imposed when said sleeve 15 is moved longitudinally along the shell to actuate said cams C and D. This advantage is made all the more effective by reason of the fact that the slot and pin connection 16 and 17, serve to rotatably connect the sleeve with the shell thereby relieving the nuts 29 and rods 26, of any thrust stresses.

It will also be noted that the cams C and D sustain the load or stress imposed thereon when the blades are shifted and while they are held in various positions, and that the nuts 29 and threaded rods 26, not only act automatically to hold the cams in adjusted positions, but they additionally function to perform this service under imposition of the load or stress that is imposed on the cams by the blades, which is fundamentally different from merely shifting a body that is not under stress.

It is believed that the device of my invention will be clearly understood from the foregoing description, and while I have herein shown and described one specific form of the invention, I do not wish to be limited thereto except for such limitations as the claims may import.

I claim:

1. In a variable speed hydraulic transmission and direct drive mechanism, a driving rotor and direct friction drive clutch member, a rotatable shell having a companion direct friction drive clutch member and enclosing said rotor and adapted to contain an interposed liquid, said rotor and shell having power transmitting blades connecting with each other through the liquid for transmitting drive from said rotor to said shell, threaded means rotatable with said shell and adjustable longitudinally of the axis of rotation of the later for changing the position of certain of said blades and automatically holding the latter in position to vary the speed of said shell, and devices operated by adjustment of said means to a substantially maximum shell speed for effecting engagement of said direct friction drive clutch members, whereby said shell will be driven at a speed equal to that of the driving rotor.

2. In a variable speed hydraulic transmission and direct drive mechanism, a driving rotor including a direct friction drive clutch member, a rotatable shell having a companion direct friction drive clutch member and said shell enclosing said rotor and being adapted to contain an interposed liquid, said rotor and shell having power transmitting blades coacting with each other through the interposed liquid for transmitting drive from said rotor to said shell, means for changing the position of certain of said blades to vary the speed of said shell, and devices operated by adjustment of said means to a substantially maximum shell speed for effecting engagement of said direct friction drive clutch members, whereby said shell will be driven at a speed equal to that of said driving rotor.

3. In a variable speed hydraulic transmission mechanism, a driven rotor, a rotatable shell enclosing said rotor and adapted to contain an interposed liquid, said rotor and shell having sets of blades coacting with the liquid to drive said shell, load sustaining cams for adjusting one set of blades and having threaded rods extending through said shell, a sleeve rotatively connected with and longitudinally slidable on said shell and provided with nuts having threaded engagement with said rods for automatically holding the latter in rotatively adjusted positions under imposition of the stress on said blades, and means for longitudinally adjusting said sleeve on said shell to actuate said cams and change the position of one set of said blades to vary the speed of rotation of said shell.

4. In combination, a variable speed hydraulic transmission mechanism having change speed elements and including constant and variable speed sections provided with direct drive friction clutch members, the first of said members being resilient and being mounted on said variable speed section to yield and the second of said clutch members being spring actuated and carried by said constant speed section and having devices for retracting said second clutch member from or releasing the same for spring actuation, and means for adjusting said change speed elements for varying the speed of said variable speed section and said means having portions for actuating said devices to retract said second clutch member from spring actuation or releasing the same for spring actuation.

6. In combination, a variable speed hydraulic transmission mechanism having change speed elements and including constant and variable speed sections provided with direct drive friction clutch members, the first of said members being resilient and being mounted on said variable speed section to yield and the second of said clutch members being spring actuated and carried by said constant speed section and having devices for retracting said second clutch member from or releasing the same for spring actuation, and means for adjusting said change speed elements for varying the speed of said variable speed section and said means having portions for actuating said devices to retract said second clutch member from spring actuation when said variable speed section is under maximum speed or releasing said second clutch member for spring actuation and effecting a direct friction drive of said variable speed section when said change speed elements have been adjusted to bring said variable speed section up to maximum speed.

6. In combination, a variable speed hydraulic transmission mechanism having change speed elements and including constant and variable speed sections provided with direct drive friction clutch members, the first of said members being mounted on said variable speed section and the second of said clutch members being spring actuated and carried by said constant speed section and having a device for retracting said second clutch member from a clutch engaging position and from spring actuation or releasing said second clutch member for clutch engagement with said first clutch member and for spring actuation, and means for adjusting said change speed elements for varying the speed of said variable speed section and said means having portions for actuating said device to retract said second clutch member from spring actuation or releasing the same for spring actuation.

V. VIRGIL PEONE.